US012684421B2

(12) United States Patent
Choi

(10) Patent No.: US 12,684,421 B2
(45) Date of Patent: Jul. 14, 2026

(54) MULTI-CONNECTION METHOD AND DEVICE BASED ON TARGET WAKE TIME

(71) Applicant: SAMSUNG ELECTRONICS CO., LTD., Suwon-si (KR)

(72) Inventor: Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 222 days.

(21) Appl. No.: 18/459,971

(22) Filed: Sep. 1, 2023

(65) Prior Publication Data

US 2023/0413119 A1    Dec. 21, 2023

Related U.S. Application Data

(63) Continuation of application No. PCT/KR2022/003044, filed on Mar. 3, 2022.

(30) Foreign Application Priority Data

Mar. 3, 2021    (KR) ........................ 10-2021-0028351

(51) Int. Cl.
 H04W 28/18 (2009.01)
 H04W 84/12 (2009.01)
(52) U.S. Cl.
 CPC ............ H04W 28/18 (2013.01); H04W 84/12 (2013.01)
(58) Field of Classification Search
 CPC . H04W 28/18; H04W 84/12; H04W 52/0245;
H04W 52/0216; H04W 76/28; H04W 72/0446; H04W 76/15; H04W 48/16; H04W 52/0225; H04W 74/04; Y02D 30/70
See application file for complete search history.

(56) References Cited

U.S. PATENT DOCUMENTS

| 10,051,680 B2 | 8/2018 | Jung et al. |
| 11,197,242 B2 | 12/2021 | Monajemi et al. |
| 11,412,466 B2 | 8/2022 | Patil et al. |
| 11,445,438 B2 | 9/2022 | Choo |
| 2018/0184285 A1 | 6/2018 | Patil et al. |
| 2019/0335454 A1 | 10/2019 | Huang et al. |

(Continued)

FOREIGN PATENT DOCUMENTS

| KR | 101217861 B1 | 1/2013 |
| KR | 20140104858 A | 8/2014 |

(Continued)

OTHER PUBLICATIONS

IEEE P802. 11ax/D7.0, Sep. 2020, 22 pages.

(Continued)

*Primary Examiner* — Eric Myers
(74) *Attorney, Agent, or Firm* — Nixon & Vanderhye, P.C.

(57)    ABSTRACT

An example electronic device may include a processor and a memory configured to store instructions. The processor may be configured to execute the instructions to: determine a first Target Wake Time (TWT) schedule by performing TWT negotiation with a first access point (AP); determine a second TWT schedule by performing TWT negotiation with a second AP; and communicate with the second AP based on the second TWT schedule while communicating with the first AP based on the first TWT schedule.

17 Claims, 10 Drawing Sheets

(56)     References Cited

U.S. PATENT DOCUMENTS

| | | | |
|---|---|---|---|
| 2020/0221545 A1 | 7/2020 | Stacey et al. | |
| 2020/0229086 A1 | 7/2020 | Monajemi et al. | |
| 2020/0374801 A1 | 11/2020 | Chu et al. | |
| 2021/0007168 A1 | 1/2021 | Asterjadhi et al. | |
| 2022/0015017 A1* | 1/2022 | Fu ........................ | H04W 48/16 |
| 2022/0124852 A1 | 4/2022 | Kim et al. | |

FOREIGN PATENT DOCUMENTS

| | | |
|---|---|---|
| KR | 20190018138 A | 2/2019 |
| KR | 20190107600 A | 9/2019 |
| WO | 2020159164 A1 | 8/2020 |

OTHER PUBLICATIONS

International Search Report of the ISA for PCT/KR2022/003044 mailed Jun. 14, 2022, 6 pages.
Written Opinion of the ISA for PCT/KR2022/003044 mailed Jun. 14, 2022, 4 pages.
Extended Search Report dated Jun. 7, 2024 in European Patent Application No. 22763621.4.
Office Action issued Dec. 10, 2025 in Korean Patent Application No. 10-2021-0028351 with English-language translation.
Notice of Allowance dated May 5, 2026 in KR Patent Application No. 10-2021-0028351 and English-language translation.

* cited by examiner

FIG. 6

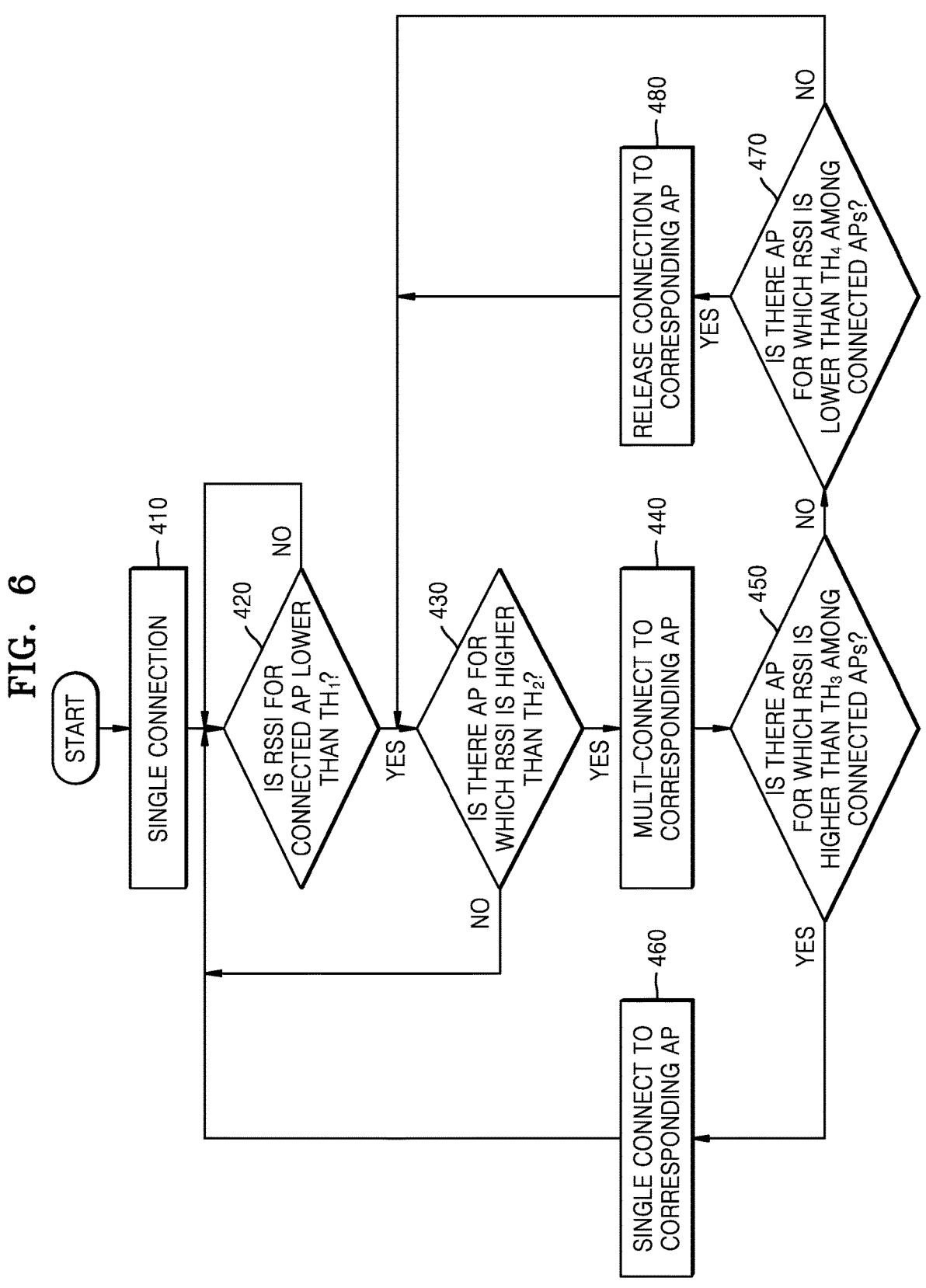

START

SINGLE CONNECTION — 410

IS RSSI FOR CONNECTED AP LOWER THAN TH₁? — 420
NO
YES

IS THERE AP FOR WHICH RSSI IS HIGHER THAN TH₂? — 430
NO
YES

MULTI-CONNECT TO CORRESPONDING AP — 440

IS THERE AP FOR WHICH RSSI IS HIGHER THAN TH₃ AMONG CONNECTED APs? — 450
NO
YES

SINGLE CONNECT TO CORRESPONDING AP — 460

IS THERE AP FOR WHICH RSSI IS LOWER THAN TH₄ AMONG CONNECTED APs? — 470
YES
NO

RELEASE CONNECTION TO CORRESPONDING AP — 480

FIG. 7
| Application layer |
|:---:|
| Transport layer (TCP, UDP) |
| Network layer (IP) |
| Logical link layer |
FIRST TWT SCHEDULE 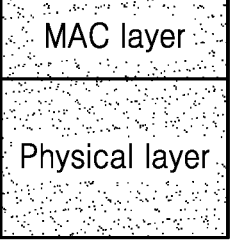 SECOND TWT SCHEDULE
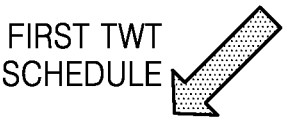
| MAC layer |
|:---:|
| Physical layer |
| MAC layer |
|:---:|
| Physical layer |

FIG. 8

MULTI-CONNECTION METHOD AND DEVICE BASED ON TARGET WAKE TIME

CROSS-REFERENCE TO RELATED APPLICATIONS

This application is a continuation application of International Application No. PCT/KR2022/003044 designating the United States, filed on Mar. 3, 2022, in the Korean Intellectual Property Receiving Office and claiming priority to Korean Patent Application No. 10-2021-0028351, filed on Mar. 3, 2021 in the Korean Intellectual Property Office, the disclosures of each of which are incorporated by reference herein in their entireties.

BACKGROUND

Field

The disclosure relates to a multi-connection method and device based on a target wake time (TWT).

Description of Related Art

As wireless local area network (LAN) technology has recently developed, Wireless Fidelity (Wi-Fi) is mounted on various devices and Wi-Fi is available in various places, such as homes, offices, schools, or on public transportation. Accordingly, many technologies have been introduced to mitigate performance degradation and increase efficiency in an environment in which many Wi-Fi terminals and access points (APs) coexist. Among them, representative technologies include a target wake time (TWT) technology in which a terminal exchanges data with an AP by negotiating a wake time with the AP and a Wi-Fi roaming technology which switches a connection from one AP to another as a terminal moves.

SUMMARY

Frequent connection switching or communication interruption may occur when an electronic device (e.g., a Wireless Fidelity (Wi-Fi) terminal) is in a state in which it is difficult to specify which access point (AP) is better to connect to, for example, when the electronic device is not located closer to any one of a plurality of APs. Example embodiments of the present disclosure provide a multi-connection method and an electronic device based on a target wake time (TWT) so that a Wi-Fi terminal communicates with a plurality of APs.

In an example embodiment, an electronic device for communicating with an access point (AP) based on a target wake time (TWT) of the Institute of Electrical and Electronics Engineers (IEEE) 802.11 standard may include a processor and a memory configured to store instructions, wherein the processor is configured to execute the instructions to: determine a first TWT schedule by performing TWT negotiation with a first AP; determine a second TWT schedule by performing TWT negotiation with a second AP; and communicate with the second AP based on the second TWT schedule while communicating with the first AP based on the first TWT schedule.

In an example embodiment, an operating method of an electronic device for communicating with an access point (AP) based on a target wake time (TWT) of the Institute of Electrical and Electronics Engineers (IEEE) 802.11 standard may include determining a first TWT schedule by performing TWT negotiation with a first AP; determining a second TWT schedule by performing TWT negotiation with a second AP; and communicating with the second AP based on the second TWT schedule while communicating with the first AP based on the first TWT schedule.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6 is a flowchart for describing an example operation by which an electronic device performs multi-connection, according to various embodiments;

FIG. 7 is a conceptual diagram illustrating an electronic device performing example operations of a medium access control (MAC) layer and a physical layer according to each of a plurality of multi-connected APs, according to various embodiments;

FIG. 8 is a conceptual diagram illustrating an example operation by which an electronic device adjusts a wake duration in real time based on a channel state, according to various embodiments;

DETAILED DESCRIPTION

Figure 1:
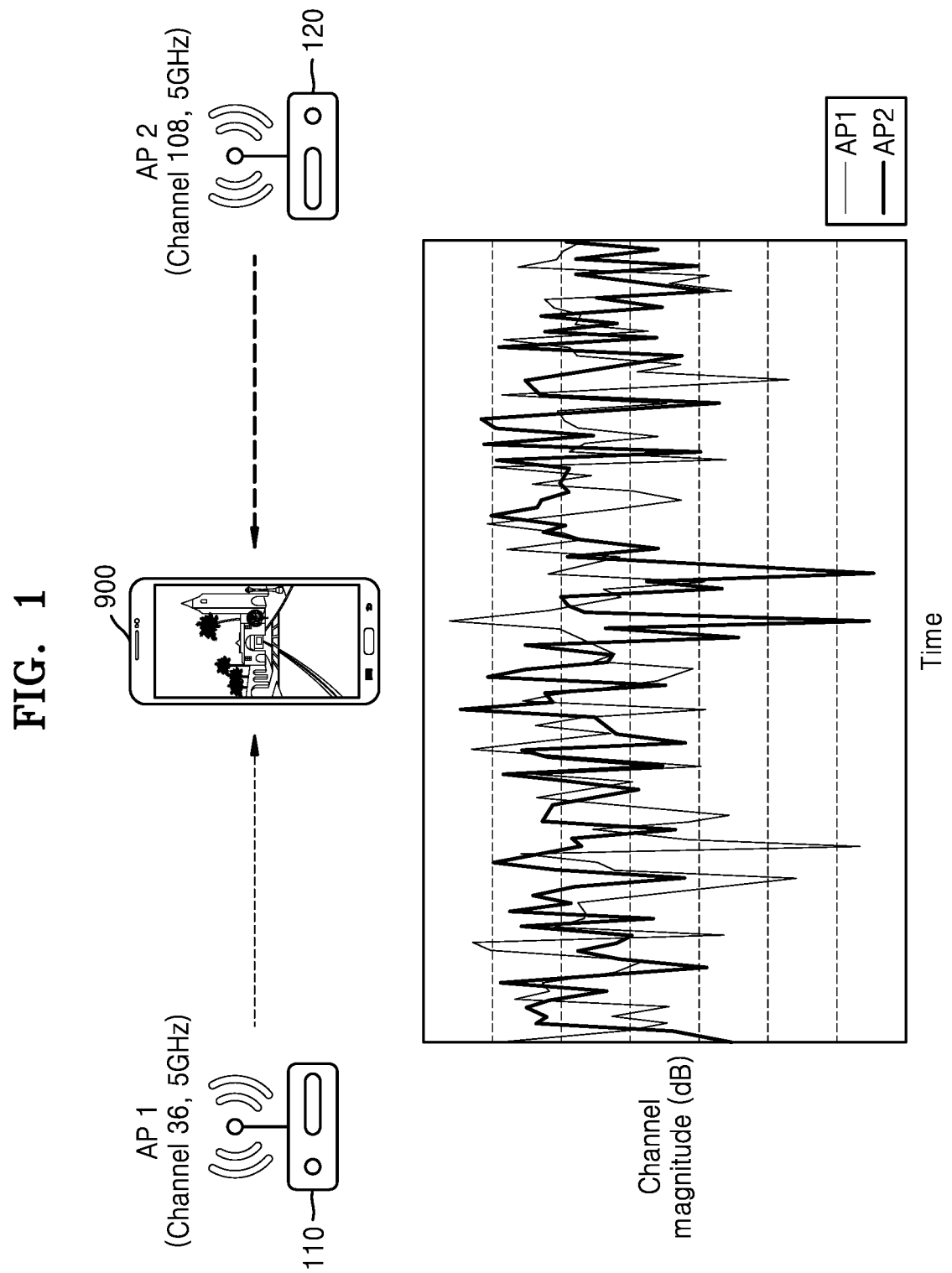
FIG. 1 is a conceptual diagram for describing a case in which a Wireless Fidelity (Wi-Fi) terminal is located in a gray zone.

In order to clarify the technical details of the present disclosure, example embodiments of the present disclosure will be described in detail with reference to the accompanying drawings. In describing the present disclosure, when a detailed description of relevant known functions or elements is determined to unnecessarily obscure the gist of the present disclosure, the detailed description thereof may be omitted. Elements having substantially the same functional configuration in the drawings are denoted by the same reference numerals and reference symbols as much as possible, even though illustrated in different drawings. For convenience of description, a device and a method are described together when necessary. Each operation of the present disclosure need not necessarily be performed in the aforementioned order, and may be performed in parallel, selectively, or separately.

FIG. 1 is a conceptual diagram for describing a case in which a Wireless Fidelity (Wi-Fi) terminal is located in a gray zone.

Referring to FIG. 1, because a Wi-Fi terminal 900 is not located closer to any one of a first access point (AP) 110 and a second AP 120, the Wi-Fi terminal 900 may be in a state in which it is difficult to specify which AP is better to connect to. This state may occur, for example, when the Wi-Fi terminal 900 is located close to one AP and then moves to another AP to perform roaming.

In this case, even when average received signal strength indications (RSSIs) from two APs are similar to each other, the Wi-Fi terminal 900 may experience fluctuations in the RSSIs from the two APs due to small-scale fading caused by a multipath signal. Accordingly, when connection switching is performed to an AP having a higher received signal among the two APs based on the RSSI, excessively frequent connection switching may occur.

In order to reduce overhead caused by frequent connection switching, a method of performing no connection switching for a certain time after a connection is established once may be taken into account. However, in this case, communication may be interrupted when the RSSI from the currently connected AP is attenuated to such an extent that communication is impossible.

In order to prevent frequent connection switching and communication interruption, a method by which the Wi-Fi terminal 900 is simultaneously connected to two APs may be taken into account. However, because existing Wi-Fi operates in accordance with a random access scheme called carrier sense multiple access with collision avoidance (CSMA/CA), it may not be suitable that one terminal is simultaneously connected to a plurality of APs.

Figure 2:
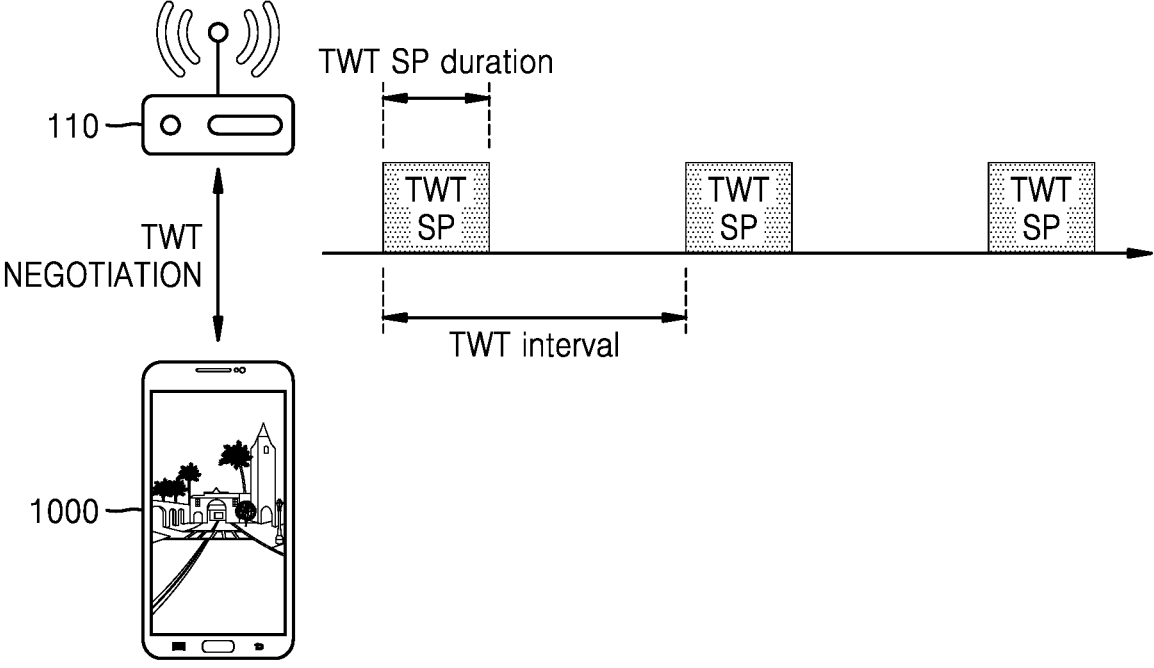
FIG. 2 is a conceptual diagram for describing a target wake time (TWT) technology of the Institute of Electrical and Electronics Engineers (IEEE) 802.11 standard.

FIG. 2 is a conceptual diagram for describing a target wake time (TWT) technology of the Institute of Electrical and Electronics Engineers (IEEE) 802.11 standard. IEEE 802.11ax introduces several technologies that increase the efficiency of Wi-Fi networks, and a representative example thereof is a TWT technology.

Referring to FIG. 2, a Wi-Fi terminal 1000 may determine a TWT schedule by performing TWT negotiation with an AP 110. The TWT schedule may include information about a time at which the Wi-Fi terminal 1000 exchanges data (e.g., a medium access control (MAC) frame) with the AP, which is determined through TWT negotiation. The TWT schedule may include a first wake time, a wake interval, and/or a wake duration. The first wake time may be a TWT among parameters in TWT negotiation. The wake interval may be determined by a TWT wake interval mantissa and a TWT wake interval exponent among parameters in TWT negotiation. The wake duration may be a nominal minimum TWT wake duration among parameters in TWT negotiation. The TWT schedule may refer, for example, to a TWT agreement.

The Wi-Fi terminal 1000 may be in a doze state (low power state) in a doze period according to the TWT schedule and may then wake up in a service period (SP) according to the TWT schedule to exchange data with the AP. The AP may adjust the SP using fields such as an end of service period (EOSP), more data, or more trigger, but the SP may be basically defined by the first wake time, the wake interval, and the wake duration. Various embodiments of the present disclosure propose a method and a device for enabling a Wi-Fi terminal to communicate with a plurality of APs based on the TWT of IEEE 802.11.

Figure 3:
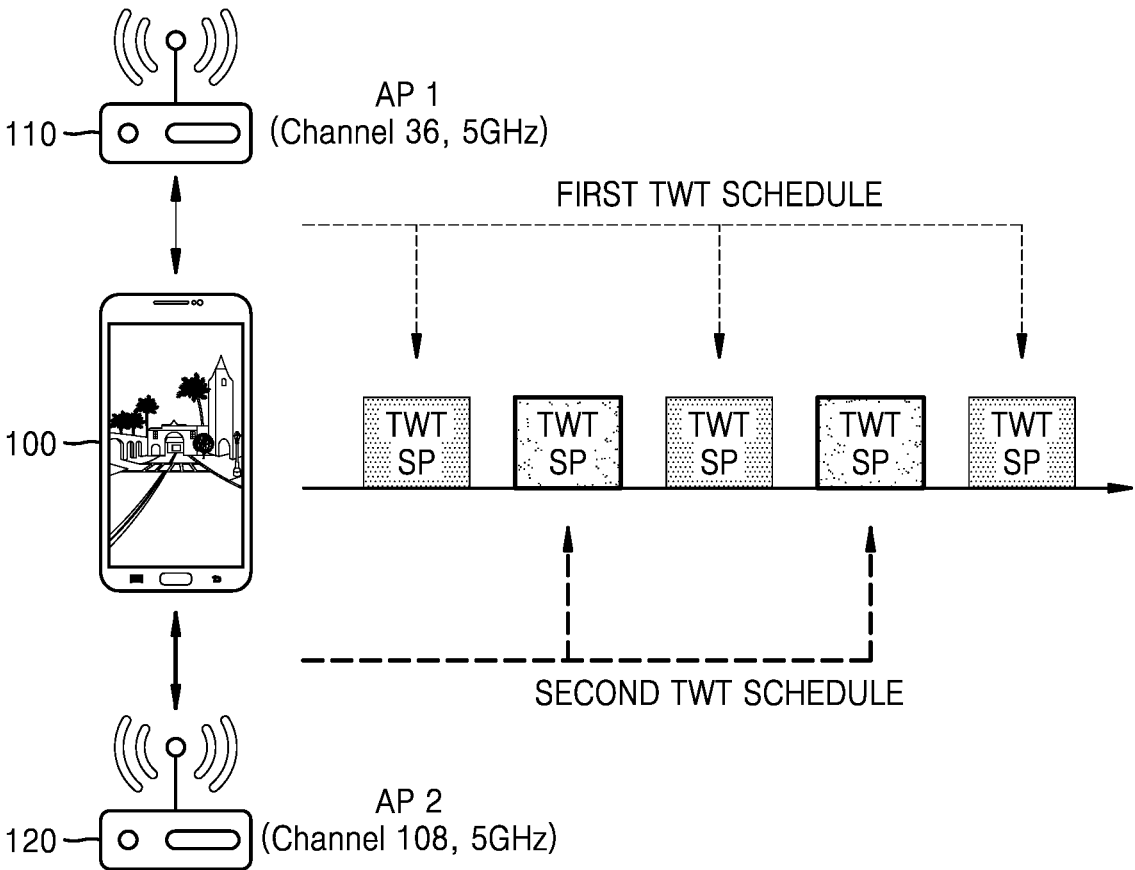
FIG. 3 is a conceptual diagram for describing an example operation by which an electronic device communicates with a plurality of access points (APs), based on a TWT, according to various embodiments.

FIG. 3 is a conceptual diagram for describing an example operation by which an electronic device communicates with a plurality of APs based on a TWT, according to an embodiment of the present disclosure.

Referring to FIG. 3, an electronic device 100 according to an embodiment of the present disclosure may determine a first TWT schedule by performing a TWT negotiation with a first AP 110, and may perform communication with the first AP 110 based on the first TWT schedule. The electronic device 100 may exchange data with the first AP 110 within an SP according to the first TWT schedule. For example, the electronic device 100 may be a Wi-Fi terminal and may communicate with the first AP 110 using channel 36 of a 5 GHz band.

In addition, the electronic device 100 may determine a second TWT schedule by performing a TWT negotiation with a second AP 120 and may perform communication with the second AP 120 based on the second TWT schedule. The electronic device 100 may exchange data with the second AP 120 within an SP according to the second TWT schedule. For example, the electronic device 100 may communicate with the second AP 120 using channel 108 of a 5 GHz band. As illustrated in FIG. 3, the SP according to the first TWT schedule may not overlap the SP according to the second TWT schedule. For example, the electronic device 100 may exchange data with the first AP 110 and the second AP 120 at different times. As such, the electronic device 100 may simultaneously communicate with a plurality of APs by exchanging data with the APs at different times based on a plurality of TWT schedules.

The expression "simultaneously communicating with a plurality of APs" does not necessarily refer to simultaneously exchanging data with a plurality of APs, as may be seen from the above description. The expression "simultaneously communicating with a plurality of APs" may refer, for example, to performing communication with another AP based on another TWT schedule while communicating with one AP based on a certain TWT schedule.

The expression "simultaneously communicating with a plurality of APs" may refer, for example, to exchanging data with another AP in the time between SPs for one AP. The expression "simultaneously communicating with a plurality of APs" may refer, for example, to exchanging data with another AP in the doze period for one AP. At this time, because the electronic device 100 exchanges data with another AP in the doze period for one AP, the doze period does not refer to a period in which the electronic device 100 actually enters the doze state (low power state), but may refer, for example, to a period in which the electronic device 100 is scheduled to be in the doze state according to the TWT schedule. The doze period may refer, for example, to a time other than the SP.

The expression "simultaneously communicating with a plurality of APs" may refer, for example, to the electronic device 100 being simultaneously connected to a plurality of APs. The expression "the electronic device 100 is connected to the AP" may refer, for example, to the electronic device 100 establishing a connection with the AP through an association procedure. For example, while the electronic device 100 communicates with the first AP 110 according to the first TWT schedule in a state of being connected to the first AP 110, the electronic device 100 may be connected to the second AP 120 and communicate with the second AP 120 according to the second TWT schedule.

Figure 4:
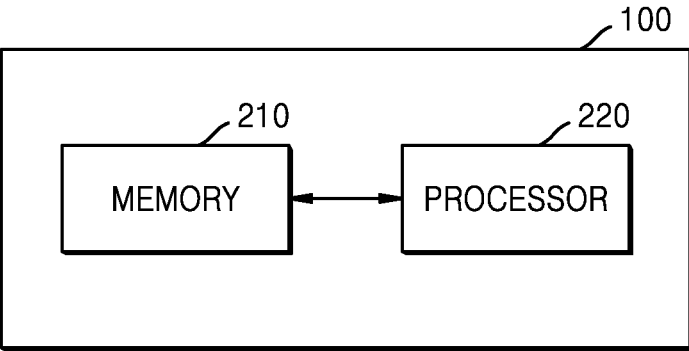
FIG. 4 is a block diagram schematically illustrating a configuration of an example electronic device that communicates with an AP based on a TWT, according to various embodiments.

FIG. 4 is a block diagram schematically illustrating a configuration of an example electronic device that communicates with an AP based on a TWT, according to various embodiments.

Referring to FIG. 4, an electronic device 100 according to an embodiment of the present disclosure may include a processor 220 and a memory 210 that stores one or more instructions executable by the processor 220.

The processor 220 may be implemented with one or more processors. The memory 210 may be one or more memories. The electronic device 100 may, for example, be a device having a Wi-Fi function, and may be a mobile device, such as a smartphone, a tablet, or a laptop computer, or a fixed device, such as a desktop computer or a closed circuit television (CCTV), or a part thereof.

A processor (e.g., the processor 220) of an electronic device (e.g., the electronic device 100) according to an example embodiment of the disclosure may execute one or more instructions stored in a memory (e.g., the memory 210) to determine a first TWT schedule by performing a TWT negotiation with a first AP (e.g., the AP 110), determine a second TWT schedule by performing a TWT negotiation with a second AP (e.g., the AP 120), and communicate with the second AP based on the second TWT schedule while communicating with the first AP based on the first TWT schedule. The meaning of the expression "communicating with the second AP while communicating with the first AP" may be the same as described above with reference to FIG. 3. For example, the processor 220 may simultaneously communicate with the first AP 110 and the second AP 120 according to different TWT schedules. As described above, the operation of determining the first TWT schedule, the operation of determining the second TWT schedule, and the operation of communicating with the second AP 120 while communicating with the first AP 110 need not necessarily be performed in the aforementioned order.

Figure 5:
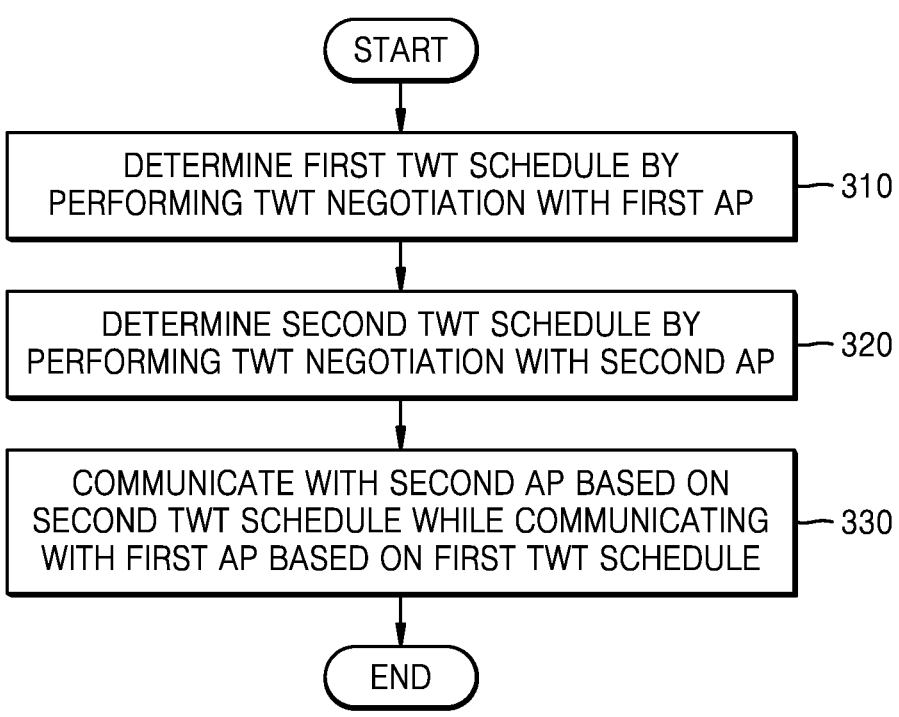
FIG. 5 is a flowchart schematically illustrating an example operating method of an electronic device, according to various embodiments.

FIG. 5 is a flowchart schematically illustrating an example operating method of an electronic device, according to various embodiments. All operations of the electronic device 100 described below, including the description of FIG. 5, may, for example, be operations that are performed by the processor 220 executing one or more instructions stored in the memory 210.

Referring to FIG. 5, in operation 310, the electronic device 100 may determine the first TWT schedule by performing aTWT negotiation with the first AP 110. In operation 320, the electronic device 100 may determine the second TWT schedule by performing a TWT negotiation with the second AP 120. In operation 330, the electronic device 100 may communicate with the second AP 120 based on the second TWT schedule while communicating with the first AP 110 based on the first TWT schedule. The meaning of the expression "communicating with the second AP 120 while communicating with the first AP 110" may be the same as described above with respect to FIG. 3. For example, the electronic device 100 may simultaneously communicate with the first AP 110 and the second AP 120 according to different TWT schedules. As described above, operations 310, 320, and 330 need not be necessarily performed in the aforementioned order. For example, the electronic device 100 may perform operation 320 of determining the second TWT schedule with the second AP 120, and then, may perform operation 310 of determining the first TWT schedule with the first AP 110.

The operating method of the electronic device (e.g., the electronic device 100) according to an example embodiment may include determining the first TWT schedule by performing a TWT negotiation with the first AP (e.g., the AP 110), determining the second TWT schedule by performing a TWT negotiation with the second AP (e.g., the AP 120), and communicating with the second AP based on the second TWT schedule while communicating with the first AP based on the first TWT schedule.

In the operating method of the electronic device (e.g., the electronic device 100) according to an example embodiment, the determining of the second TWT schedule by performing TWT negotiation with the second AP (e.g., the AP 120) may include performing TWT negotiation with the second AP (e.g., the AP 120) based on the first TWT schedule.

In the operating method of the electronic device (e.g., the electronic device 100) according to an example embodiment, the determining of the second TWT schedule by performing TWT negotiation with the second AP (e.g., the AP 120) may include determining the second TWT schedule so that the SP according to the first TWT schedule does not overlap the SP according to the second TWT schedule.

The operating method of the electronic device (e.g., the electronic device 100) according to an example embodiment may further include adjusting at least one of the first TWT schedule and the second TWT schedule by performing TWT negotiation with at least one of the first AP (e.g., the AP 110) and the second AP (e.g., the AP 120) based on a channel state for the first AP (e.g., the AP 110) and a channel state for the second AP (e.g., the AP 120).

The operating method of the electronic device (e.g., the electronic device 100) according to an example embodiment may further include connecting to the second AP (e.g., the AP 120) while maintaining a state of being connected to the first AP (e.g., the AP 110).

When performing TWT negotiation with the second AP (e.g., the AP 120), the electronic device (e.g., the electronic device 100) according to an example embodiment may perform negotiation based on the first TWT schedule. For example, the electronic device 100 may determine the first TWT schedule by performing TWT negotiation with the first AP 110, and then may perform TWT negotiation with the second AP 120 by taking into account the determined first TWT schedule. In this manner, the electronic device (e.g., the electronic device 100) may determine the second TWT schedule so that the SP according to the first TWT schedule does not overlap the SP according to the second TWT schedule.

The electronic device (e.g., the electronic device 100) may set an interval between the SP according to the first TWT schedule and the SP according to the second TWT schedule. For example, the electronic device (e.g., the electronic device 100) may determine the second TWT schedule so that a time interval equal to or longer than a specified time is set between the SP according to the first TWT schedule and the SP according to the second TWT schedule. In this manner, interference between the communication with the first AP 110 and the communication with the second AP 120 may be reduced.

The electronic device (e.g., the electronic device 100) may connect to the second AP (e.g., the AP 120) while maintaining a state of being connected to the first AP (e.g., the AP 110). The electronic device 100 may perform TWT negotiation with the AP in a procedure for connecting to the AP, for example, in an association procedure, or may perform TWT negotiation after connecting to the AP. In a state of being connected to the first AP 110, the electronic device 100 may perform TWT negotiation with the second AP 120 by taking into account the first TWT schedule while connecting to the second AP 120. After connecting to the second AP 120 in a state of being connected to the first AP 110, the electronic device 100 may perform TWT negotiation with the second AP 120 by taking into account the first TWT schedule. Hereinafter, the connection of the electronic device 100 to one AP is referred to as a single connection, and the connection of the electronic device 100 to a plurality of APs is referred to as a multi-connection.

FIG. 6 is a flowchart for describing an example operation by which an electronic device performs multi-connection, according to various embodiments.

Referring to FIG. 6, in operation 410, the electronic device 100 may establish single connection by connecting to one AP. For example, the electronic device 100 may be single-connected to the first AP 110.

The electronic device (e.g., the electronic device 100) according to an example embodiment may attempt multi-connection in a state of being single-connected to the first AP (e.g., the AP 110) when RSSI for the first AP is low according to a specified criterion. According to an embodiment, in operation 420, the electronic device 100 may determine whether RSSI for the single-connected AP is low according to a first specified criterion. The electronic device 100 may attempt multi-connection when the RSSI for the single-connected AP is low according to the first specified criterion.

The state in which the RSSI for the single-connected AP is low according to the first specified criterion may be, for example, a state in which RSSI for the AP is lower than a first specified threshold value $Th_1$. According to an embodiment, the RSSI for the AP may be a value measured for a specified time. For example, the RSSI for the AP may be an average value for a specified time. The specified time may be set to be sufficiently longer than a period of small-scale fading in a typical Wi-Fi usage environment.

As another example, the state in which the RSSI for the single-connected AP is low according to the first specified criterion may be a state in which the RSSI for the AP is kept lower than the first specified threshold value for a specified time or longer. The specified time may be set to be sufficiently longer than a period of small-scale fading in a typical Wi-Fi usage environment.

According to an embodiment, the electronic device 100 may attempt multi-connection when the RSSI for the single-connected AP is low according to a first criterion. For example, attempting multi-connection may be searching for an AP suitable for multi-connection. The electronic device 100 may search for an AP suitable for multi-connection in a period other than an SP according to a TWT schedule with respect to the currently connected AP (for example, the single-connected AP (e.g., the first AP 110)). The electronic device 100 may search for an AP suitable for multi-connection in a doze period according to the TWT schedule with respect to the currently connected AP (e.g., the first AP 110). When the electronic device 100 does not exchange data with the currently connected AP (e.g., the first AP 110) in the SP according to the TWT schedule with respect to the currently connected AP, the electronic device 100 may search for an AP suitable for multi-connection.

The AP suitable for multi-connection may be an AP (e.g., the second AP 120), for which the RSSI is high according to a second specified criterion. For example, in operation 430, the electronic device 100 may determine whether there is an AP suitable for multi-connection, for which the RSSI is high according to the second specified criterion. The state in which the RSSI for the AP suitable for multi-connection is high according to the second specified criterion may be, for example, a state in which the RSSI for the AP is higher than a second specified threshold value $Th_2$. As another example, the state in which the RSSI for the AP suitable for multi-connection is high according to the second specified criterion may be a state in which the RSSI for the AP is kept higher than the second specified threshold value for a specified time or longer. According to an embodiment, the second threshold value may be less than the first threshold value. For example, the first threshold value may be a criterion for determining whether the electronic device 100 operates with single connection or with multi-connection, and the second threshold value may be a criterion for selecting APs that are multi-connection candidates when the electronic device 100 operates with multi-connection.

In a state of being single-connected to the first AP (e.g., the AP 110), when the AP (e.g., the AP 120) is found in which the RSSI for the first AP is low according to the first specified criterion and is high according to the second specified criterion, the electronic device (e.g., the electronic device 100) according to an example embodiment may switch to a multi-connected state by connecting to the found AP. For example, in operation 440, when the AP (e.g., the second AP 120) suitable for multi-connection is found, the electronic device 100 may connect to the corresponding AP. In a state of being single-connected to one AP (e.g., the first AP 110), when the AP is found in which the RSSI for the single-connected AP is low according to the first specified criterion and is high according to the second specified criterion, the electronic device 100 may switch to a multi-connected state by connecting to the corresponding AP. For example, in a state of being single-connected to the first AP 110, when the RSSI for the first AP 110 is low according to the first specified criterion and the RSSI for the second AP 120 is high according to the second specified criterion, the electronic device 100 may switch to a multi-connected state by connecting to the second AP 120 while maintaining the connection to the first AP 110. As described above, when connecting to a new AP (e.g., the second AP 120), the electronic device 100 may perform TWT negotiation with the newly connected AP (e.g., the second AP 120) by taking into account the TWT schedule of the currently single-connected AP (e.g., the first AP 110).

When a plurality of APs suitable for multi-connection are found, the electronic device 100 may be connected to an AP having the highest RSSI among the found APs. The electronic device 100 may, for example, be connected to a plurality of APs among the found APs. The electronic device 100 may, for example, be connected to all the found APs. For example, the electronic device 100 may be sequentially connected to the APs. According to an embodiment, the electronic device 100 may be multi-connected to up to the specified number of APs. For example, when the electronic device 100 is multi-connected to up to the specified number of APs, the electronic device 100 may be connected to the currently connected AP and the APs in a descending order of the RSSI. As another example, when the electronic device 100 is multi-connected to up to the specified number of APs, the electronic device 100 may be connected to the APs in a descending order of the RSSI.

When the electronic device 100 is connected to a new AP in a state of being connected to a plurality of APs, the electronic device 100 may perform TWT negotiation with the new AP by taking into account the TWT schedules of the currently connected APs. The processor may perform TWT negotiation so that the TWT SPs of all the multi-connected APs do not overlap each other.

In a state of being multi-connected to a plurality of APs, when the RSSI for any one of the multi-connected APs is high according to the specified criterion, the electronic device (e.g., the electronic device 100) according to an example embodiment may switch to a state of being single-connected to the corresponding AP. For example, when the RSSI for any one of a plurality of multi-connected APs is high according to a third specified criterion, the electronic device 100 may switch to a state of being single-connected to the corresponding AP. In operation 450, the electronic device 100 may determine whether there is an AP for which the RSSI is high according to the third specified criterion among the multi-connected APs. In operation 460, when there is such an AP, the electronic device 100 may switch to a state of being single-connected to the corresponding AP. Switching to the state of being single-connected to the corresponding AP may be releasing the connection to the remaining AP(s). For example, in a state of being multi-connected to the first AP 110 and the second AP 120, when the RSSI for the second AP 120 is high according to the third specified criterion, the electronic device 100 may release the connection to the first AP 110 and switch to a state of being single-connected to the second AP 120.

The state in which the RSSI for the AP is high according to the third specified criterion may be, for example, a state in which the RSSI for the AP is higher than a third specified threshold value $Th_3$. The third specified threshold value may be equal to the first specified threshold value. According to an embodiment, frequent switching between single connection and multi-connection may be prevented by setting the third specified threshold value to a value higher than the first specified threshold value.

As another example, the state in which the RSSI for the AP is high according to the third specified criterion may be a state in which the RSSI for the AP is kept higher than the third specified threshold value for a specified time or longer. In this case, even when the third specified threshold value is equal to the first specified threshold value, frequent switching between single connection and multi-connection may be prevented.

When there are a plurality of APs for which the RSSI is high according to the third specified criterion, the electronic device 100 may switch to a state of being single-connected to one of the APs. The electronic device 100 may switch to a state of being single-connected to an AP having the highest RSSI among the APs.

In a state of being multi-connected to a plurality of APs, when the RSSI for any one of the multi-connected APs is low according to a specified criterion, the electronic device (e.g., the electronic device 100) according to an example embodiment may release the connection to the corresponding AP. For example, when the RSSI for any one of a plurality of multi-connected APs is low according to a fourth specified criterion, the electronic device 100 may release the connection to the corresponding AP. In operation 470, the electronic device 100 may determine whether there is an AP for which the RSSI is low according to the fourth specified criterion among the multi-connected APs. In operation 480, when there is such an AP, the electronic device 100 may release the connection to the corresponding AP. After the release of the connection, when a plurality of connected APs remain, the multi-connected state may be maintained, and when only one connected AP remains, the state may be switched to a single connected state. For example, in a state of being multi-connected to the first AP 110 and the second AP 120, when the RSSI for the first AP 110 is low according to the fourth specified criterion, the electronic device 100 may release the connection to the first AP 110 and switch to a state of being single-connected to the second AP 120.

The state in which the RSSI for the AP is low according to the fourth specified criterion may be, for example, a state in which the RSSI for the AP is lower than a fourth specified threshold value $Th_4$. The fourth specified threshold value may be equal to the second specified threshold value. According to an embodiment, frequent connection and disconnection for one AP may be reduced or prevented by setting the fourth specified threshold value to a value lower than the second specified threshold value.

As another example, the state in which the RSSI for the AP is low according to the fourth specified criterion may be a state in which the RSSI for the AP is kept lower than the fourth specified threshold value for a specified time or longer. In this case, even when the fourth specified threshold value is equal to the second specified threshold value, frequent connection and disconnection for one AP may be reduced or prevented.

According to an embodiment, the electronic device 100 may perform additional connection by searching for an AP suitable for multi-connection even in a multi-connected state. For example, the electronic device 100 may perform operation 430 even in a multi-connected state. According to an embodiment, the electronic device 100 may perform AP search for the currently connected APs in a period other than the SP according to the TWT schedule. According to an embodiment, the electronic device 100 may perform AP search for all the currently connected APs in a doze period according to the TWT schedule. According to an embodiment, the electronic device 100 may perform AP search when not exchanging data with any of the currently connected APs.

The flowchart of FIG. 6 is only an example, and operations 410 to 480 described above need not necessarily be performed in the order illustrated in FIG. 6. For example, when the state is switched to the single connected state after the release of the connection in operation 480, the electronic device 100 may perform operation 420. According to an embodiment, the specified threshold values and the specified times described above may be values fixed when the electronic device 100 is manufactured. According to an embodiment, the specified thresholds and/or the specified times may be adjusted by learning. According to an embodiment, the specified threshold values and the specified times may be values set by a user.

According to an embodiment, in order to communicate with a plurality of APs, the electronic device 100 has to perform a communication function according to each of the APs. For example, when the electronic device 100 exchanges data with the first AP 110, each communication layer of the electronic device 100 has to perform a function corresponding to each communication layer of the first AP 110, and when the electronic device 100 exchanges data with the second AP 120, each communication layer of the electronic device 100 has to perform a function corresponding to each communication layer of the second AP 120. According to an embodiment, the electronic device 100 may change the operation of each communication layer according to the counterpart AP that currently exchanges data.

In an embodiment, when multi-connected APs are all connected to the same gateway, the electronic device 100 only needs to change an operation of a physical layer and an operation of a MAC layer according to the AP, and does not need to change an operation of a layer higher than the MAC layer (hereinafter referred to as an "upper layer"). For example, in most roaming networks today, APs in the roaming network are connected to a common gateway, and thus, connection switching between APs is performed without IP renewal. Therefore, the electronic device 100 may perform multi-connection in the roaming network even when only the operations of the physical layer and the MAC layer are changed according to the AP.

According to an embodiment, the electronic device 100 may perform the operations of the MAC layer and the physical layer according to the counterpart AP that currently exchanges data among the multi-connected APs, and the operation of the upper layer may be performed in the same manner regardless of the counterpart AP. Performing the operations of the MAC layer and the physical layer according to the counterpart AP may refer, for example, to performing operations corresponding to the operations of the MAC layer and the physical layer of the counterpart AP. Performing the operation of the upper layer in the same manner regardless of the counterpart AP may refer, for example, to performing the same communication function regardless of with which AP data is to be exchanged. Performing the operation of the upper layer in the same manner may include using the same IP address and the same transmission control protocol/user datagram protocol (TCP/UDP) port.

For example, when the electronic device (e.g., the electronic device 100) performs communication based on the first TWT schedule, the electronic device (e.g., the electronic device 100) may perform the operations of the MAC layer and the physical layer according to the first AP (e.g., the AP 110), and when the electronic device (e.g., the electronic device 100) performs communication based on the second TWT schedule, the electronic device (e.g., the electronic device 100) may perform the operations of the MAC layer and the physical layer according to the second AP (e.g., the AP 120). When the electronic device (e.g., the electronic device 100) performs communication based on the first TWT schedule, the electronic device (e.g., the electronic device 100) may perform the operation of the upper layer in the same manner as when the electronic device (e.g., the electronic device 100) performs communication based on the second TWT schedule.

This operation may be understood as the same concept as having a separate MAC layer and a separate physical layer for each multi-connected AP and switching to the corresponding MAC layer and the corresponding physical layer according to the TWT schedule, as illustrated in FIG. 7.

In this manner, in order to change only the operations of the MAC layer and the physical layer in a state of being multi-connected to a plurality of APs, when performing multi-connection to a new AP, the electronic device 100 may identify whether the corresponding AP is an AP connected to the same gateway as the previously connected AP(s). For example, after the electronic device 100 is connected to the new AP, the electronic device 100 may determine whether the corresponding AP is connected to the same gateway as the previously connected AP(s). When the corresponding AP is not connected to the same gateway as the previously connected AP(s), the electronic device 100 may release the connection to the corresponding AP. In order to determine whether the APs are connected to the same gateway, the electronic device 100 may identify a MAC address of the gateway to which the APs are connected. After the electronic device (e.g., the electronic device 100) is connected to the second AP (e.g., the AP 120) in a state of being connected to first AP (e.g., the AP 110), the electronic device (e.g., the electronic device 100) according to an example embodiment may transmit an address resolution protocol (ARP) request to the second AP using an IP address of the gateway of the first AP, may determine whether a MAC address of a response to the ARP request is identical to the MAC address of the gateway, and may release the connection to the second AP when the MAC address of the response is different from the MAC address of the gateway. For example, after the electronic device 100 is connected to the second AP 120 in a state of being connected to the first AP 110, the electronic device 100 may transmit an ARP request to the second AP 120 using the IP address of the gateway of the first AP 110, and may determine whether the MAC address of the response to the ARP request is identical to the MAC address of the gateway of the first AP 110. When the MAC address of the response to the ARP request is not identical to the MAC address of the gateway of the first AP 110, the electronic device 100 may release the connection to the second AP.

According to an example embodiment, when the electronic device 100 performs multi-connection to the APs, the electronic device 100 may perform TWT negotiation by taking into account a channel state. For example, the channel state may include RSSI, signal-to-noise ratio (SNR), and/or throughput for each AP. The TWT negotiation performed by taking into account the channel state may be performed in order to determine a TWT schedule when the electronic device 100 is connected to a new AP, and may be performed in order to adjust a TWT schedule for an already connected AP. According to an embodiment, the electronic device 100 may adjust a TWT schedule in real time according to a current channel state. The adjustment of the TWT schedule may be performed periodically or may be performed when the adjustment is necessary according to the channel state.

The electronic device (e.g., the electronic device 100) according to an example embodiment may adjust at least one of the first TWT schedule and the second TWT schedule by performing TWT negotiation with at least one of the first AP and the second AP based on the channel state for the first AP (e.g., the AP 110) and the channel state for the second AP (e.g., the AP 120). The electronic device (e.g., the electronic device 100) may perform the adjustment in a state of being multi-connected to the first AP and the second AP.

The electronic device (e.g., the electronic device 100) may allocate a longer wake duration to an AP having a good channel state. For example, the electronic device (e.g., the electronic device 100) may perform the adjustment so that a wake duration of an AP having a better channel state among the first AP (e.g., the AP 110) and the second AP (e.g., the AP 120) is longer than a wake duration of an AP having a worse channel state among the first AP and the second AP.

For example, the electronic device 100 may allocate the wake duration to each AP in proportion to expected throughput obtained by multiplying a link speed of each AP by a normal packet transmission rate (a transmission rate excluding retransmission). The link speed of each AP may be obtained according to settings of a modulation and coding scheme (MCS), a spatial stream, and/or a bandwidth for connection to each AP.

As another example, the electronic device 100 may allocate the wake duration of each AP according to the following equation.

$$D_i = I \times \frac{\log_2(1 + SNR_i)}{\sum_i \log_2(1 + SNR_i)}$$

$D_i$ is a wake duration of an $i^{th}$ AP, I is a wake interval, and $SNR_i$ is an SNR of the $i^{th}$ AP.

In an embodiment, the wake interval may be set to be sufficiently shorter than a cycle of small-scale fading in a typical Wi-Fi usage environment. The electronic device 100 may adjust the wake interval according to the channel state. For example, the electronic device 100 may adjust the wake interval to be shorter than the current cycle of small-scale fading.

Figure 8:
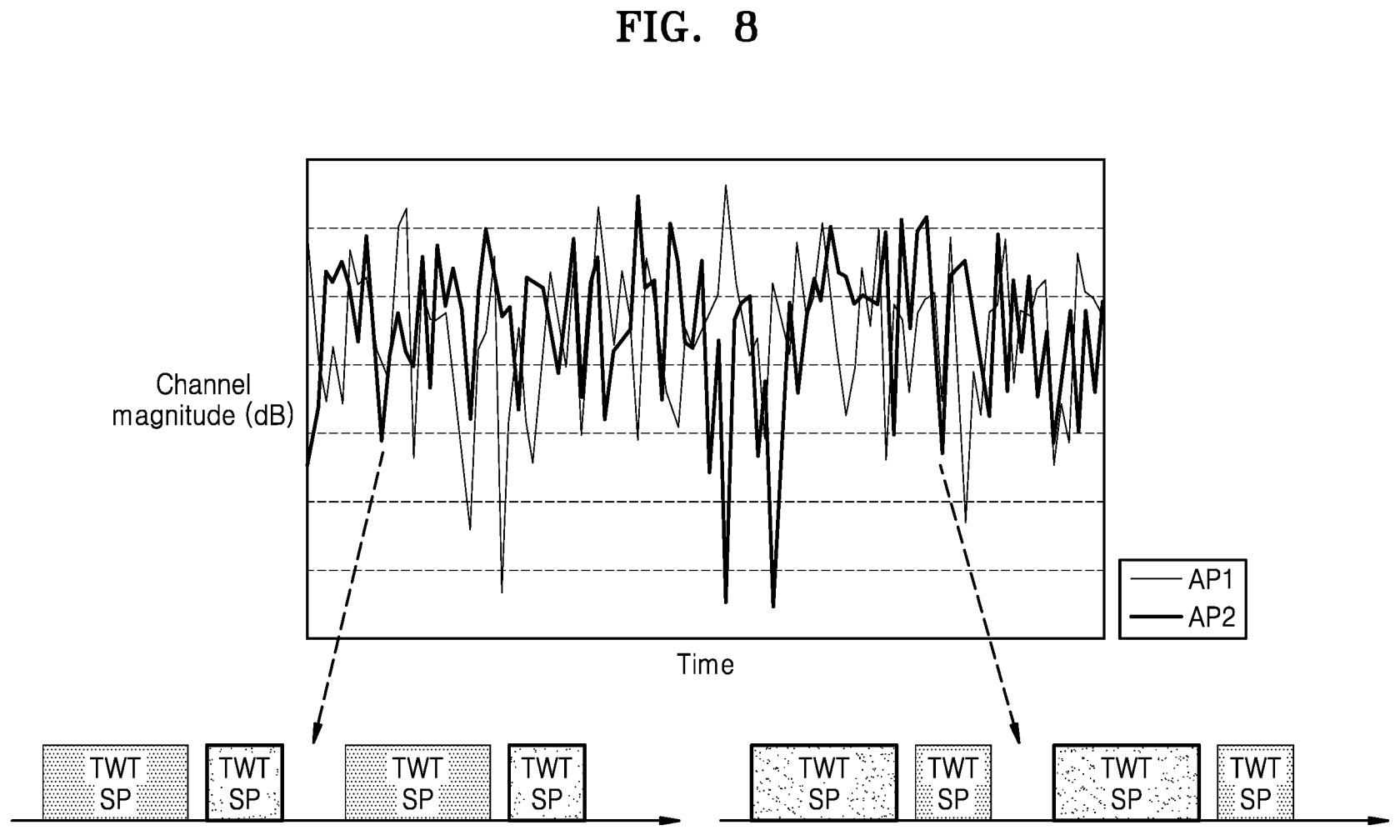

FIG. 8 is a conceptual diagram illustrating an example operation by which an electronic device adjusts a wake duration in real time based on a channel state, according to various embodiments. For example, in the electronic device 100, the SNR for the first AP (e.g., the AP 110) may be higher than the SNR for the second AP (e.g., the AP 120) in a first time interval, and the SNR for the second AP may be higher than the SNR for the first AP in a second time period. The electronic device 100 according to an embodiment may set a longer wake duration for an AP having a higher SNR. For example, the wake duration for the first AP (e.g., the AP 110) may be set to be longer than the wake duration for the second AP (e.g., the AP 120) in the first time interval, and the wake duration for the second AP may be set to be longer than the wake duration for the first AP in the second time interval.

In an embodiment, a user may select whether to permit multi-connection to a plurality of APs. For example, the electronic device 100 may receive a selection input for selecting whether to permit multi-connection from a user through a menu on a screen, and may perform multi-connection based on the selection input.

Figure 9:
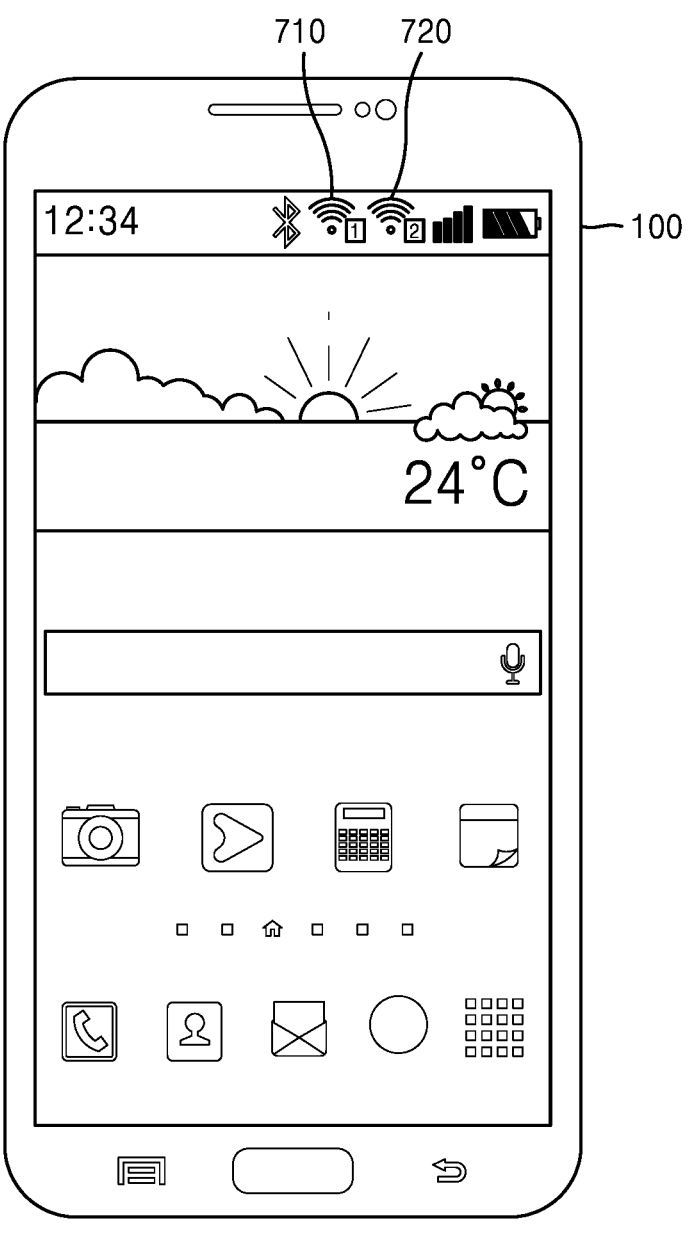
FIG. 9 is a diagram illustrating an example electronic device displaying a multi-connected state on a screen, according to various embodiments.

The electronic device (e.g., the electronic device 100) according to an example embodiment may notify a user of a multi-connected state. The electronic device (e.g., the electronic device 100) may display, on the display, a connection state with the first AP (e.g., the AP 110) and a connection state with the second AP (e.g., the AP 120). For example, as illustrated in FIG. 9, the electronic device 100 may display a connection state 710 with the first AP 110 and a connection state 720 with the second AP 120 in a form of a status bar on the screen. In this case, displaying the connection state may simply indicate that a plurality of APs are connected, or may indicate RSSI for each connected AP. According to an embodiment, the electronic device 100 may provide, to the user, a screen for setting the multi-connected state. For example, the user may set conditions (e.g., signal strength) for performing multi-connection with a plurality of APs. As another example, when the electronic device 100 is in the multi-connected state, the electronic device 100 may perform single connection based on a selection of a user.

Figure 10:
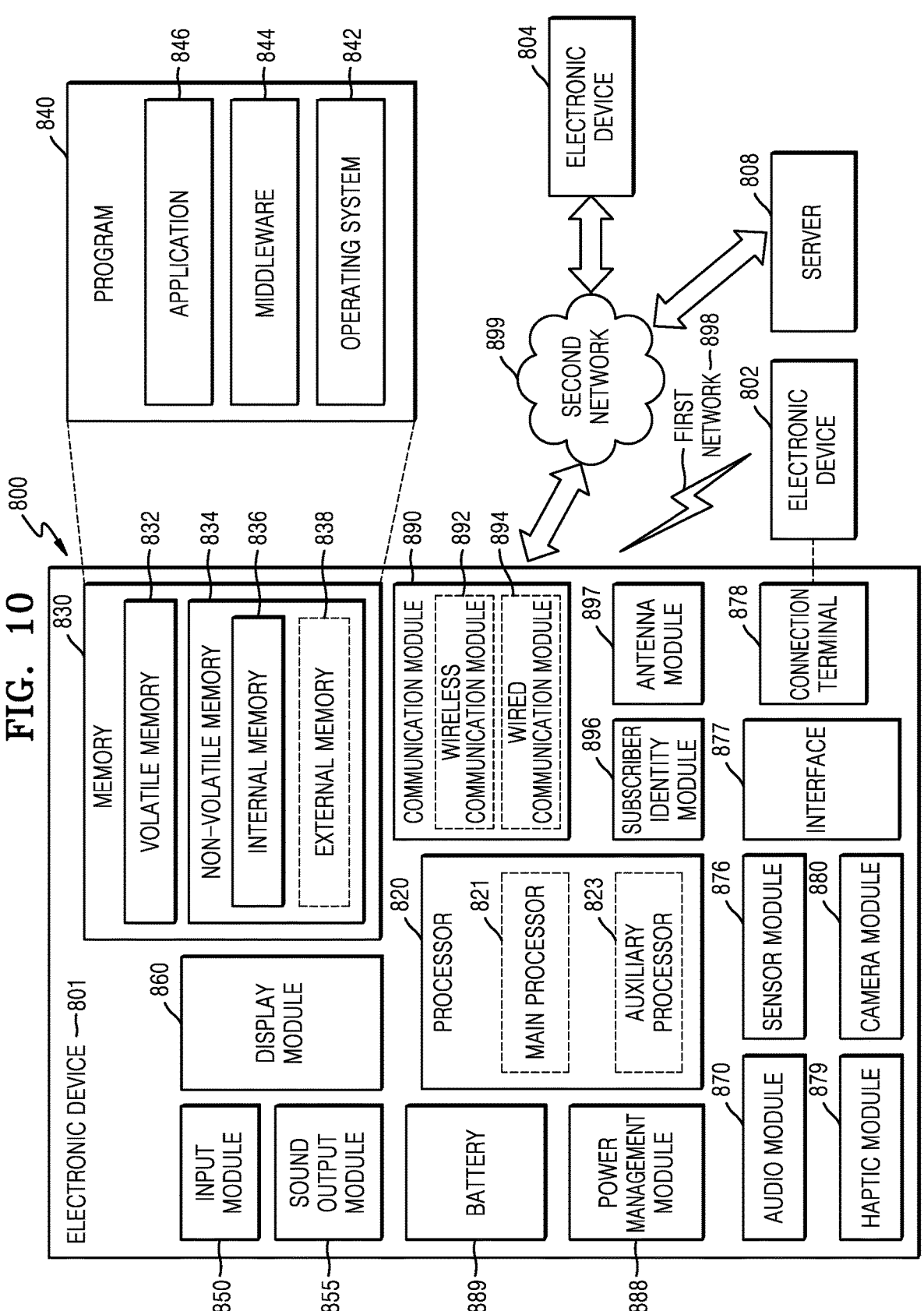
FIG. 10 is a block diagram of an example electronic device in a network environment, according to various embodiments.

FIG. 10 is a block diagram of an example electronic device 801 in a network environment 800, according to various embodiments.

Referring to FIG. 10, the electronic device 801 in the network environment 800 may communicate with an electronic device 802 via a first network 898 (e.g., a short-range wireless communication network), or may communicate with at least one of an electronic device 804 or a server 808 via a second network 899 (e.g., a long-range wireless communication network). According to an embodiment, the electronic device 801 may communicate with the electronic device 804 through the server 808. The electronic device 801 may be the electronic device 100.

According to an embodiment, the electronic device 801 may include a processor 820 (e.g., the processor 220), a memory 830 (e.g., the memory 210), an input module 850, a sound output module 855, a display module 860, an audio module 870, a sensor module 876, an interface 877, a connection terminal 878, a haptic module 879, a camera module 880, a power management module 888, a battery 889, a communication module 890, a subscriber identity module 896, or an antenna module 897. In various embodiments, at least one of these elements (e.g., the connection terminal 878) may be omitted in the electronic device 801, or one or more other elements may be added to the electronic device 801. In various embodiments, some elements (e.g., the sensor module 876, the camera module 880, or the antenna module 897) may be integrated into one element (e.g., the display module 860).

The processor 820 may execute software (e.g., a program 840, etc.) to control one or more other elements (e.g., hardware or software elements, etc.) of the electronic device 801 connected to the processor 820, and may perform various data processing or operations. According to an embodiment, as at least part of data processing or operations, the processor 820 may store, in a volatile memory 832, commands or data received from other elements (e.g., the sensor module 876 or the communication module 890), may process the commands or data stored in the volatile memory 832, and may store result data in a non-volatile memory 834. According to an embodiment, the processor 820 may include a main processor 821 (e.g., a central processing unit or an application processor) or an auxiliary processor 823 (e.g., a graphics processing unit, a neural processing unit (NPU), an image signal processor, a sensor hub processor, or a communication processor) that is operable independently of or in conjunction with the main processor 821. For example, when the electronic device 801 includes the main processor 821 and the auxiliary processor 823, the auxiliary processor 823 may use less power than the main processor 821 or may be set to be specialized for a designated function. The auxiliary processor 823 may be implemented separately from the main processor 821 or may be implemented as part of the main processor 821.

For example, the auxiliary processor 823 may control at least some of the functions or states related to at least one of the elements of the electronic device 801 (e.g., the display module 860, the sensor module 876, or the communication module 890) on behalf of the main processor 821 while the main processor 821 is in an inactive state (e.g., a sleep state) or together with the main processor 821 while the main processor 821 is in an active state (e.g., an application execution state). According to an embodiment, the auxiliary processor 823 (e.g., the image signal processor or the communication processor) may be implemented as part of other functionally related elements (e.g., the camera module 880 or the communication module 890). According to an embodiment, the auxiliary processor 823 (e.g., the NPU) may include a hardware structure specialized for processing an artificial intelligence model. The artificial intelligence model may be generated through machine learning. For example, such learning may be performed in the electronic device 801 itself in which the artificial intelligence model is executed, or may be performed through a separate server (e.g., the server 808). A learning algorithm may include, for example, supervised learning, unsupervised learning, semi-supervised learning, or reinforcement learning, but the present disclosure is not limited to the above example. The artificial intelligence model may include a plurality of artificial neural network layers. The artificial intelligence model may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but the present disclosure is not limited to the above example. The artificial intelligence model may additionally or alternatively include a software structure in addition to the hardware structure.

The memory 830 may store a variety of data used by at least one element (e.g., the processor 820 or the sensor module 876) of the electronic device 801. The data may include, for example, the software (e.g., the program 840) and input data or output data for commands related thereto. The memory 830 may include the volatile memory 832 or the non-volatile memory 834.

The program 840 may be stored in the memory 830 as software and may include, for example, an operating system 842, a middleware 844, or an application 846.

The input module 850 may receive, from the outside of the electronic device 801 (e.g., the user), commands or data to be used by the elements (e.g., the processor 820) of the electronic device 801. The input module 850 may include, for example, a microphone, a mouse, a keyboard, a key (e.g., a button), or a digital pen (e.g., a stylus pen).

The sound output module 855 may output a sound signal to the outside of the electronic device 801. The sound output module 855 may include, for example, a speaker or a receiver. The speaker may be used for general purposes, such as multimedia reproduction or recording reproduction. The receiver may be used to receive an incoming call. According to an embodiment, the receiver may be implemented separately from the speaker or may be implemented as part of the speaker.

The display module 860 may visually provide information to the outside of the electronic device 801 (e.g., the user). The display module 860 may include, for example, a display, a hologram device, a projector, and a control circuit configured to control the corresponding device. According to an embodiment, the display module 860 may include a touch sensor configured to detect a touch or a pressure sensor configured to measure the intensity of force generated by the touch.

The audio module 870 may convert a sound into an electrical signal or vice versa. According to an embodiment, the audio module 870 may obtain a sound through the input module 850, or may output a sound through the sound output module 855, or a speaker or a headphone of an external electronic device (e.g., the electronic device 802) directly or wirelessly connected to the electronic device 801.

The sensor module 876 may sense an operating state (e.g., power or temperature) of the electronic device 801 or an external environmental state (e.g., a user condition), and may generate an electrical signal or a data value corresponding to the sensed state. According to an embodiment, the sensor module 876 may include, for example, a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 877 may support one or more designated protocols that may be used by the electronic device 801 so as to directly or wirelessly connect to the external electronic device (e.g., the electronic device 802). According to an embodiment, the interface 877 may include, for example, a high definition multimedia interface (HDMI), a universal serial bus (USB) interface, a secure digital (SD) card interface, or an audio interface.

The connection terminal 878 may include a connector through which the electronic device 801 may be physically connected to the external electronic device (e.g., the electronic device 802). According to an embodiment, the connection terminal 878 may include an HDMI connector, a USB connector, an SD card connector, or an audio connector (e.g., a headphone connector).

The haptic module 879 may convert an electrical signal into a mechanical stimulus (e.g., vibration or movement) or an electrical stimulus which a user may recognize through a tactile or kinesthetic sense. According to an embodiment, the haptic module 879 may include, for example, a motor, a piezoelectric element, or an electrical stimulator.

The camera module 880 may capture a still image and a moving image. According to an embodiment, the camera module 880 may include one or more lenses, image sensors, image signal processors, or flashes.

The power management module 888 may manage power to be supplied to the electronic device 801. According to an embodiment, the power management module 888 may be implemented as part of a power management integrated circuit (PMIC).

The battery 889 may supply power to at least one element of the electronic device 801. According to an embodiment, the battery 889 may include, for example, a non-rechargeable primary cell, a rechargeable secondary cell, or a fuel cell.

The communication module 890 may establish a direct (e.g., wired) communication channel or a wireless communication channel between the electronic device 801 and the external electronic device (e.g., the electronic device 802, the electronic device 804, or the server 808), and may support communication through the established communication channel. The communication module 890 may include one or more communication processors that operate independently of the processor 820 (e.g., the application processor) and support direct (e.g., wired) communication or wireless communication. The communication module 890 may be the electronic device 100.

According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication module). The corresponding communication module among these communication modules may communicate with the external electronic device 804 via the first network 898 (e.g., a short-range communication network such as Bluetooth™, Wi-Fi direct, or Infrared data association (IrDA)) or the second network 899 (e.g., a long-range communication network such as a legacy cellular network, a $5^{th}$ generation (5G) network, a next-generation communication network, Internet, or a computer network (e.g., LAN or wide area network (WAN)). These various types of communication modules may be integrated into one element (e.g., a single chip) or may be implemented as a plurality of elements (e.g., a plurality of chips) separate from each other. The wireless communication module 892 may identify or authenticate the electronic device 801 within the communication network, such as the first network 898 or the second network 899, by using subscriber information (e.g., international mobile subscriber identity (IMSI)) stored in the subscriber identity module 896.

The wireless communication module 892 may support a 5G network after a $4^{th}$ generation (4G) network and a next-generation communication technology, for example, a new radio (NR) access technology. The NR access technology may support enhanced mobile broadband (eMBB), massive machine type communications (mMTC), or ultra-reliable and low-latency communications (URLLC). The wireless communication module 892 may support, for example, a high frequency band (e.g., mmWave band) in order to achieve a high throughput. The wireless communication module 892 may support various technologies for securing performance in a high frequency band, for example, beamforming, massive multiple-input and multiple-output (MIMO), full dimensional MIMO (FD-MIMO), array antenna, analog beamforming, or large scale antenna. The wireless communication module 892 may support various requirements defined for the electronic device 801, the external electronic device (e.g., the electronic device 804), or the network system (e.g., the second network 899). According to an embodiment, the wireless communication module 892 may support a peak data rate for eMBB realization (e.g., 20 Gbps or more), a loss coverage for mMTC realization (e.g., 164 dB or less), or U-plane latency for URLLC realization (e.g., downlink (DL) and uplink (UL) each less than 0.5 ms or round trip less than 1 ms).

The antenna module 897 may transmit a signal and/or power to the outside (e.g., the electronic device) or receive a signal and/or power from the outside (e.g., the electronic device). According to an embodiment, the antenna module 897 may include an antenna including a radiator made of (or including) a conductor or a conductive pattern on a substrate (e.g., a printed circuit board (PCB)). According to an embodiment, the antenna module 897 may include a plurality of antennas (e.g., an array antenna). In this case, at least one antenna suitable for the communication scheme used in the communication network, such as the first network 898 or the second network 899 may be selected from among the antennas by the communication module 890. The signal or power may be transmitted or received between the communication module 890 and the external electronic device through the selected at least one antenna. According to various embodiments, in addition to the radiator, other elements (e.g., a radio frequency integrated circuit (RFIC)) may be additionally formed as part of the antenna module 897.

According to various embodiments, the antenna module 897 may form a mmWave antenna module. According to an embodiment, the mmWave antenna module may include a PCB, an RFIC disposed on or adjacent to a first surface (e.g., a bottom surface) of the PCB and capable of supporting a designated high frequency band (e.g., mmWave band), and a plurality of antennas (e.g., an array antenna) disposed on or adjacent to a second surface (e.g., a top surface or a side surface) of the PCB and capable of transmitting or receiving a signal of the designated high frequency band.

At least some elements may be connected to each other through a communication scheme between peripheral devices (e.g., a bus, a general purpose input and output (GPIO), a serial peripheral interface (SPI), or a mobile industry processor interface (MIPI)), and may exchange a signal (e.g., a command or data) with each other.

According to an embodiment, the command or data may be transmitted or received between the electronic device 801 and the external electronic device 804 through the server 808 connected to the second network 899. The type of the external electronic device 802 or 804 may be identical to or different from the type of the electronic device 801. According to an embodiment, all or part of the operations that are performed by the electronic device 801 may be performed by one or more of the external electronic devices 802, 804, and 808. For example, when the electronic device 801 has to execute a certain function or service automatically or in response to a request from a user or other devices, the electronic device 801 may request one or more external electronic devices to execute at least part of the function or service instead of or in addition to executing the function or service by itself. The one or more external electronic devices receiving the request may execute at least part of the requested function or service or an additional function or service related to the request, and may transmit a result of the executing to the electronic device 801. The electronic device 801 may provide the result as it is or may provide the result as at least part of a response to the request by additionally processing the result. To this end, for example, cloud computing, distributed computing, mobile edge computing (MEC), or client-server computing technology may be used. The electronic device 801 may provide an ultra-low latency service by using, for example, distributed computing or mobile edge computing. In an embodiment, the external electronic device 804 may include an internet of things (IoT) device. The server 808 may be an intelligent server using machine learning and/or neural networks. According to an embodiment, the external electronic device 804 or the server 808 may be included in the second network 899. The electronic device 801 may be applied to intelligent services (e.g., smart home, smart city, smart car, or health care) based on 5G communication technology and IoT-related technology.

The electronic devices according to various example embodiments disclosed in the present disclosure may be various types of devices. The electronic devices may include, for example, portable communication devices (e.g., a smartphone), computer devices, portable multimedia devices, portable medical devices, cameras, wearable devices, home appliances, or the like. The electronic device according to an embodiment of the present disclosure is not limited to the devices described above.

Various embodiments of the present disclosure and terms as used therein are not intended to limit the technical features described in the present disclosure to specific embodiments, but should be understood as including various modifications, equivalents, or substitutes of the embodiments. In connection with the description of the drawings, like reference numbers may be used to denote like or related elements. A singular form of a noun corresponding to an item may include one item or more items, unless the relevant context clearly indicates otherwise. In the present disclosure, the expressions "A or B," "at least one of A and B," "at least one of A or B," "A, B, or C," "at least one of A, B, and C," and "at least one of A, B, or C" may include any one of the items listed in the corresponding expression or all possible combinations thereof. The terms "first," "second," etc. as used herein may be only used to distinguish one element from another and do not limit the elements in any other aspects (e.g., importance or order). When a certain (e.g., first) element is referred to as being "coupled" or "connected" to another (e.g., second) element with or without the terms "functionally" or "communicatively," the certain element may be coupled or connected to the other element directly (e.g., by wire) or wirelessly or through a third element.

The term "module" as used in various embodiments of the present disclosure may include a unit implemented in hardware, software, or firmware, or any combination thereof, and may be used interchangeably with, for example, "logics," "logic blocks," "components," or "circuits." The module may be an integrally constructed component or a minimal unit of the component or a portion thereof that performs one or more functions. For example, according to an embodiment, the module may be implemented in the form of an application-specific integrated circuit (ASIC).

Various embodiments of the present disclosure may be implemented as software (e.g., the program 840) including one or more instructions stored in a storage medium (e.g., an internal memory 836 or an external memory 838) readable by a machine (e.g., the electronic device 801). For example, a processor (e.g., the processor 820) of the machine (e.g., the electronic device 801) may call at least one command among the one or more instructions stored from the storage medium and execute the called at least one command. This enables the device to operate to execute at least one function according to the called at least one instruction. The one or more instructions may include code generated by a compiler or code executable by an interpreter. The storage medium that is readable by the machine may be provided in the form of a non-transitory storage medium. The non-transitory storage medium is a tangible device and refers to not including a signal (e.g., electromagnetic waves). This term does not distinguish between a case where data is semi-permanently stored in a storage medium and a case where data is temporarily stored in a storage medium.

According to an embodiment, the methods according to various example embodiments may be provided by being included in a computer program product. The computer program products may be traded between a seller and a buyer as commodities. The computer program product may be distributed in the form of a machine-readable storage medium (e.g., compact disc read only memory (CD-ROM)), or may be distributed (e.g., downloaded or uploaded) online, either via an application store (e.g., Play Store™) or directly between two user devices (e.g., smartphones). In the case of the online distribution, at least part of the computer program product may be stored at least temporarily on a machine-readable storage medium, such as a server of a manufacturer, a server of an application store, or a memory of a relay server, or may be temporarily generated.

According to various embodiments, the respective elements (e.g., the modules or the programs) described above may include one or more entities, and some entities may be separately disposed in other elements. According to various embodiments, one or more operations or elements among the above-described elements may be omitted, or one or more other operations or elements may be added. Alternatively or additionally, a plurality of elements (e.g., the modules or the programs) may be integrated into a single element. In this case, the integrated element may execute one or more functions of each of the elements identically or similarly to those executed by the corresponding element among the elements prior to the integration. According to various embodiments, operations performed by modules, programs, or other elements may be performed sequentially, in parallel, iteratively, or heuristically, one or more of the operations may be performed in a different order or may be omitted, or one or more other operations may be added.

So far, the present disclosure has been described in detail, focusing on preferred embodiments illustrated in the drawings. These embodiments are merely illustrative rather than restrictive, and should be considered in an illustrative aspect rather than a restrictive aspect. It will be understood by those of ordinary skill in the art to which the present disclosure pertains that these embodiments may be easily modified into specific forms, without changing the technical spirit or essential features of the present disclosure. For example, the elements described as being singular may be implemented in a distributed manner. Similarly, the elements described as being distributed may be implemented in a combined form. Although specific terms are used in the disclosure, the specific terms are only used for the purpose of explaining the concept of the present disclosure and are not used to limit the scope of the present disclosure described in the claims.

The true technical scope of protection of the present disclosure should be determined not by the foregoing description, but by the technical spirit of the appended claims, and all changes or modifications derived from the meaning and scope of the claims and equivalent concepts thereof should be construed as falling within the scope of the present disclosure. The equivalents should be understood to include currently known equivalents as well as equivalents developed in the future, for example, all elements disclosed to perform the same functions regardless of the structures.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device for communicating with an access point (AP) based on a target wake time (TWT), the electronic device comprising:

memory configured to store instructions, at least one processor comprising processing circuitry configured to execute the instructions and to control the electronic device to:

determine a first TWT schedule by performing TWT negotiation with a first AP;

determine a second TWT schedule different from the first TWT schedule by performing TWT negotiation with a second AP, wherein the second TWT schedule is determined so that a first service period according to the first TWT schedule does not overlap a second service period according to the second TWT schedule; and communicate in a multi-connected state with the second AP based on the second TWT schedule and with the first AP based on the first TWT schedule.

2. The electronic device of claim 1, wherein at least one processor comprising processing circuitry is configured to control the electronic device to perform the TWT negotiation with the second AP based on the first TWT schedule.

3. The electronic device of claim 1, wherein at least one processor comprising processing circuitry is configured to control the electronic device to determine the second TWT schedule so that a time interval equal to or longer than a specified time is set between the first service period and the second service period.

4. The electronic device of claim 1, wherein at least one processor comprising processing circuitry is configured to control the electronic device to, when the electronic device is in a single-connected state of being connected to the first AP, attempt to establish a multi-connection with another AP when a received signal strength indication for the first AP is low according to a specified criterion.

5. The electronic device of claim 1, wherein at least one processor comprising processing circuitry is configured to, when the electronic device is in a single-connected state of being connected to the first AP and a received signal strength indication (RSSI) for the first AP is lower than a first specified criterion, control the electronic device to search for an AP having an RSSI higher than a second specified criterion, wherein the second AP is an AP found during the search.

6. The electronic device of claim 1, wherein at least one processor comprising processing circuitry is configured to, when the electronic device is in the multi-connected state and a received signal strength indication (RSSI) for any one or more of multi-connected APs is higher than a specified criterion, switch to a single-connected state of being single-connected to the AP whose RSSI is highest among the any one or more of the multi-connected APs.

7. The electronic device of claim 1, wherein at least one processor comprising processing circuitry is configured to, when the electronic device is in the multi-connected state and a received signal strength indication (RSSI) for any one of multi-connected APs is lower than a specified criterion, release connection to the any one of the multi-connected APs.

8. The electronic device of claim 1, wherein at least one processor comprising processing circuitry is configured to control the electronic device to:

when performing communication based on the first TWT schedule, perform operations of a medium access control (MAC) layer and a physical layer according to the first AP; and when performing communication based on the second TWT schedule, perform operations of the MAC layer and the physical layer according to the second AP.

9. The electronic device of claim 8, wherein, when communication is performed based on the first TWT schedule, an operation of an upper layer is performed in a same manner as when communication is performed based on the second TWT schedule.

10. The electronic device of claim 9, wherein at least one processor comprising processing circuitry is configured to control the electronic device to:

after connecting to the second AP in a state of being connected to the first AP, transmit an address resolution protocol (ARP) request to the second AP using an IP address of a gateway of the first AP;

determine whether a MAC address of a response to the ARP request is identical to a MAC address of the gateway; and release the connection to the second AP when the MAC address of the response is different from the MAC address of the gateway.

11. The electronic device of claim 1, wherein at least one processor comprising processing circuitry is configured to control the electronic device to adjust at least one of the first TWT schedule and the second TWT schedule by performing TWT negotiation with at least one of the first AP and the second AP, based on a channel state for the first AP and a channel state for the second AP.

12. The electronic device of claim 11, wherein at least one processor comprising processing circuitry is configured to control the electronic device to perform adjustment so that a wake duration of an AP having a better channel state among the first AP and the second AP is longer than a wake duration of an AP having a worse channel state among the first AP and the second AP.

13. The electronic device of claim 1, wherein at least one processor comprising processing circuitry is configured to control the electronic device to display, on a screen, a connection state with the first AP and a connection state with the second AP.

14. An operating method of an electronic device for communicating with an access point (AP) based on a target wake time (TWT), the operating method comprising:

determining a first TWT schedule by performing TWT negotiation with a first AP;

determining a second TWT schedule different from the first TWT schedule by performing TWT negotiation with a second AP, wherein the second TWT schedule is determined so that a first service period according to the first TWT schedule does not overlap a second service period according to the second TWT schedule; and communicating in a multi-connected state with the second AP based on the second TWT schedule and with the first AP based on the first TWT schedule.

15. The method of claim 14, further comprising:

performing the TWT negotiation with the second AP based on the first TWT schedule.

16. The method of claim 15, further comprising:

adjusting at least one of the first TWT schedule and the second TWT schedule by performing TWT negotiation with at least one of the first AP and the second AP, based on a channel state for the first AP and a channel state for the second AP.

17. A non-transitory computer-readable storage medium storing instructions that, when executed by at least one processor, cause an electronic device for communicating with an access point (AP) based on a target wake time (TWT) to:

determine a first TWT schedule by performing TWT negotiation with a first AP;

determine a second TWT schedule different from the first TWT schedule by performing TWT negotiation with a second AP, wherein the second TWT schedule is determined so that a first service period according to the first TWT schedule does not overlap a second service period according to the second TWT schedule; and communicate in a multi-connected state with the second AP based on the second TWT schedule and with the first AP based on the first TWT schedule.

* * * * *